W. DALL.
FENCE DROPPER.
APPLICATION FILED SEPT. 6, 1912.

1,075,769.

Patented Oct. 14, 1913.

Witnesses:

Inventor
William Dall
by
James L. Norris
Atty

UNITED STATES PATENT OFFICE.

WILLIAM DALL, OF DUNEDIN, NEW ZEALAND.

FENCE-DROPPER.

1,075,769.  Specification of Letters Patent.  Patented Oct. 14, 1913.

Application filed September 6, 1912. Serial No. 718,991.

*To all whom it may concern:*

Be it known that I, WILLIAM DALL, merchant, a subject of His Majesty the King of Great Britain, residing at 30 York Place, in the city of Dunedin, in the British Dominion of New Zealand, have invented certain new and useful Improvements in Fence-Droppers, and do hereby declare that the following is a full, clear, and exact description of the invention, such as will enable others skilled in the art to which it appertains to make and use the same.

This invention relates to those intermediate and light spreading standards that are often used between the stronger posts of a wire fence, and are known as "droppers."

My object is to diminish the number of notches in the droppers, thus either making them stronger or as strong and lighter, also so that while the droppers are tightly fixed in the wires, the said wires can be strained through them as the one notch to each does not bind as two do. For these purposes I make the droppers of L section and of slightly springy material, preferably steel, and cut the notches alternately near one edge or the other leaving the opposite edge plain and therefore stronger. Also where the notches are in pairs their position has to be exact, but this is obviously not the case with one notch. The droppers may be inserted in a fence by hand, or, if wires are tight, by a spanner-like bar interlocking each notch from either end as most convenient.

Figure 1:
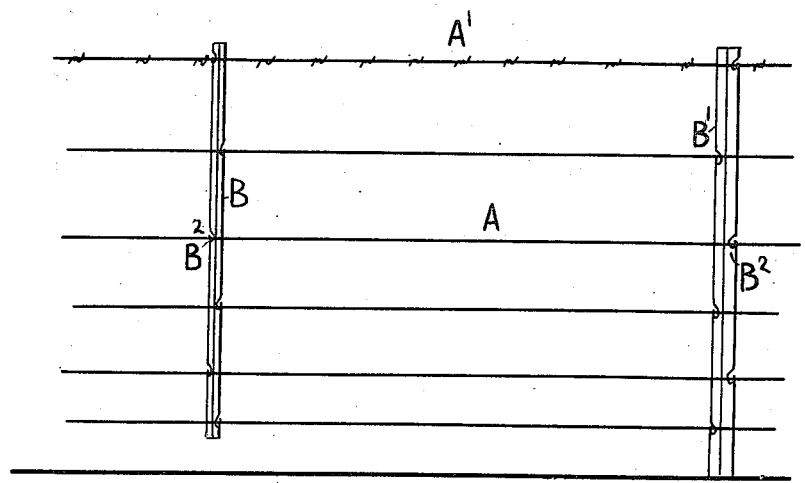
Figure 2:
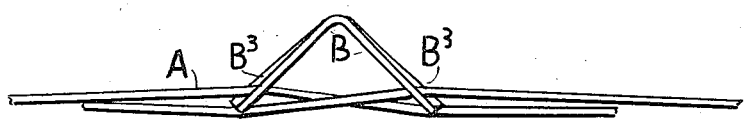
Figure 3:
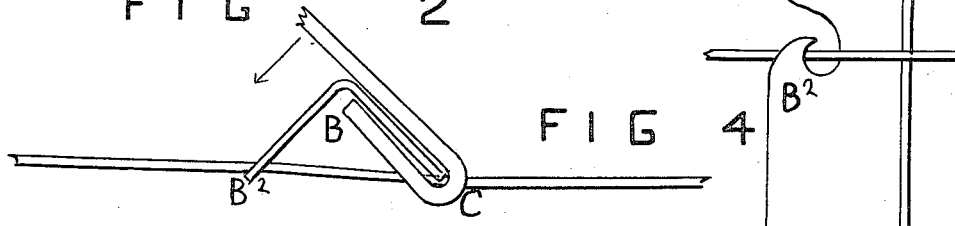
Figure 4:
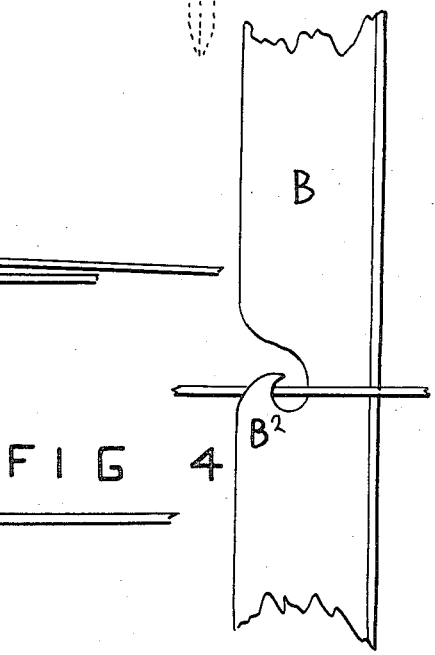
Figure 5:
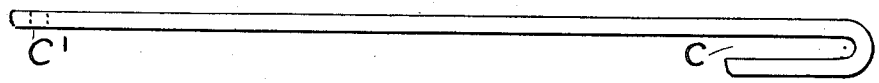

Referring to the accompanying drawing:—Figure 1 shows an ordinary fence having a barbed, and plain wires with a dropper and also a stronger one which may be extended to enter the ground if desired. Fig. 2 is an enlarged detail plan of a dropper in place, showing the zig-zag or cross straining of the fence wires, the droppers being slightly bent where the strained wires cross the unnotched edges, which keep them tightly in position, as they straighten when the tension slackens. Fig. 3 shows the spanner in position for springing the wire into a notch, and Fig. 4 shows the preferred profile of each of the said notches. Fig. 5 is an edge view of the special spanner, which is applied alternately to either of the edges of a dropper for springing the wires into the notches or removing them therefrom, one by one, as needed.

A are plain wires and $A^1$ is a barbed wire, either may be used.

B is the dropper and $B^1$ one of stronger make, longer and capable of being driven into the ground, as indicated.

$B^2$ $B^2$ are the notches formed with bell-mouthed entrance for easy springing in of the wire and also to avoid catching wool, &c., from animals.

$B^3$ $B^3$ show the slight springy bend the dropper assumes when the wires are strained, and this is the gist of the invention, the droppers being more firmly fixed than if the usual double notches were carefully formed in exact relation to each other, the present droppers being capable of taking any size or make of wire used in fencing.

C is the spanner-bar, used as shown alternately on each flange, and $C^1$ is a hanging hole, or may be used for manipulating wire ends.

These droppers are placed in a fence (preferably with the hooks of the notches pointing up, as shown, as thus they do not become displaced if a wire is stepped on,) in a vertical position, thus permitting barbed wire to be as easily fixed as plain wire, which is not the case with many makes, the droppers being placed at an angle and afterward brought to the vertical.

The reason why, with the present droppers, a wire can be tightened better than when a dropper has notches in pairs, is, that the double notches give a vertical kink to the wires; but as the present droppers are springy, the plain edge gives during tightening of a wire which allows of said tightening without displacing the dropper. This springing is important as it keeps the wire tight even when by the heat of the sun it is slightly expanded, which is not the case with rigid droppers.

In this invention any suitable materials or sizes may be adopted.

The foregoing being a full description of my invention, what I desire to patent by Letters Patent of the United States of America, is:—

1. A resilient dropper of angle section having a bell-mouthed hook-notch for each wire formed alternately in the edges of its flanges, the portion of the edge opposite each notch being left plain, said dropper being of sufficient lightness to be sprung slightly outward by the tightening of each wire, whereby the wires are maintained taut by the sprung flanges of the dropper, and the latter is held in position by the remaining wires when any one of said wires is being tightened.

2. Fence droppers formed of thin angle section springy material, with one retaining notch formed for each wire, alternately on opposite flanges, the edges opposite each notch being plain, the said dropper being of sufficient lightness to be sprung slightly outward by the tightening of each wire, so that the wires are kept tight by the tendency of the flanges of the said dropper to return to the normal position of straightness, all substantially as set forth.

Dated this 19th day of April, 1912.

In testimony whereof, I have hereunto set my hand in presence of two subscribing witnesses.

WILLIAM DALL.

Witnesses:
 HENTON MACAULAY DAVEY,
 THOMAS WALTERS.

Copies of this patent may be obtained for five cents each, by addressing the "Commissioner of Patents, Washington, D. C."